(12) United States Patent
Rashley et al.

(10) Patent No.: US 12,054,418 B2
(45) Date of Patent: Aug. 6, 2024

(54) FLUID-COOLED NEEDLE FOR MOLTEN MATERIAL FLOW CONTROL

(71) Applicant: Owens-Brockway Glass Container Inc., Perrysburg, OH (US)

(72) Inventors: Shane T. Rashley, Bowling Green, OH (US); Russel K. Fleetwood, Ottawa Hills, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 522 days.

(21) Appl. No.: 17/039,734

(22) Filed: Sep. 30, 2020

(65) Prior Publication Data

US 2022/0388883 A1 Dec. 8, 2022

(51) Int. Cl.
| | |
|---|---|
| *C03B 5/23* | (2006.01) |
| *C03B 5/183* | (2006.01) |
| *C03B 7/086* | (2006.01) |
| *C03B 7/094* | (2006.01) |
| *C03B 11/16* | (2006.01) |

(52) U.S. Cl.
CPC ............... *C03B 5/183* (2013.01); *C03B 5/23* (2013.01); *C03B 7/086* (2013.01); *C03B 7/094* (2013.01)

(58) Field of Classification Search
CPC .. C03B 7/086; C03B 5/26; C03B 7/08; C03B 7/10; B29C 48/687; B29C 45/231; B65G 65/40
See application file for complete search history.

(56) References Cited

U.S. PATENT DOCUMENTS

| | | | |
|---|---|---|---|
| 324,495 A | | 8/1885 | Stone et al. |
| 1,166,576 A | * | 1/1916 | Bowman ................. C03B 7/088 65/327 |
| 1,328,799 A | * | 1/1920 | Peiler ..................... C03B 7/086 65/356 |
| 1,603,160 A | * | 10/1926 | Soubier .................... C03B 7/08 65/325 |
| 1,828,443 A | * | 10/1931 | Rankin .................... C03B 7/08 65/331 |

(Continued)

FOREIGN PATENT DOCUMENTS

| | | | | |
|---|---|---|---|---|
| AT | 391128 B | * | 8/1990 | ............. C03B 5/167 |
| DE | 19644673 A1 | | 4/1998 | |

(Continued)

OTHER PUBLICATIONS

Int. Search Report and Written Opinion, Int. Serial No. PCT/US2021/052567, Applicant: Owens-Brockway Glass Container Inc., Mail Date: Mar. 17, 2022.

*Primary Examiner* — Alison L Hindenlang
*Assistant Examiner* — Steven S Lee

(57) ABSTRACT

A molten material furnace system having a liquid cooled flow control mechanism and method are disclosed. In particular, the flow control mechanism can include a needle including: a longitudinal axis; an outer conduit including an outer base end, an outer body, and an outer free end; an inner conduit including an inner base end, an inner body radially spaced from the outer body, an inner free end, and a central inlet passage extending between the inlet and the inner free end. Also disclosed is a needle control assembly to position the flow control needle relative to a stilling tank outlet orifice to control flow of molten material through the outlet orifice.

21 Claims, 4 Drawing Sheets

(56) References Cited

U.S. PATENT DOCUMENTS

| | | | |
|---|---|---|---|
| 1,845,635 A * | 2/1932 | Soubier | C03B 7/08 |
| | | | 65/331 |
| 2,982,522 A | 5/1961 | Hamilton et al. | |
| 3,580,714 A * | 5/1971 | Lucek | C03B 7/086 |
| | | | 65/355 |
| 3,580,976 A * | 5/1971 | le Clerc de Bussy | C03B 7/088 |
| | | | 373/40 |
| 3,912,488 A * | 10/1975 | Sanford | C03B 5/1675 |
| | | | 65/374.11 |
| 3,983,309 A | 9/1976 | Faulkner et al. | |
| 4,047,918 A | 9/1977 | Heithoff | |
| 4,125,352 A | 11/1978 | Gellert | |
| 4,350,516 A * | 9/1982 | Faulkner | C03B 5/26 |
| | | | 65/327 |
| 4,351,054 A | 9/1982 | Olds | |
| 4,824,462 A * | 4/1989 | Schwenninger | C03B 17/04 |
| | | | 65/356 |
| 4,925,384 A * | 5/1990 | Manner | B29C 45/2806 |
| | | | 264/328.9 |
| 5,071,340 A | 12/1991 | LaBianca | |
| 5,567,218 A * | 10/1996 | Ladirat | C03B 5/005 |
| | | | 222/592 |
| 5,706,851 A | 1/1998 | Lopez-Gomez et al. | |
| 6,058,741 A * | 5/2000 | Sobolev | C03B 5/26 |
| | | | 65/335 |
| 6,613,291 B1 * | 9/2003 | Sobolev | C03B 5/021 |
| | | | 422/903 |
| 6,896,856 B2 * | 5/2005 | Sobolev | G21F 9/08 |
| | | | 422/198 |
| 8,236,182 B2 * | 8/2012 | Lehman | B01D 21/0006 |
| | | | 166/267 |
| 8,689,588 B2 | 4/2014 | Hirayama et al. | |
| 10,167,220 B2 | 1/2019 | Boughton et al. | |
| 2016/0340219 A1 | 11/2016 | Miller | |
| 2017/0240450 A1 | 8/2017 | Meng et al. | |
| 2018/0118601 A1 * | 5/2018 | Brown-Tsai | C03B 17/064 |
| 2018/0155231 A1 * | 6/2018 | Kenyon | C03B 5/26 |
| 2019/0375668 A1 * | 12/2019 | Bookbinder | C03B 17/064 |

FOREIGN PATENT DOCUMENTS

| | | | | |
|---|---|---|---|---|
| FR | 2692344 A1 * | 12/1993 | | B09B 3/0066 |
| JP | H0959030 A * | 3/1997 | | C03B 7/086 |
| JP | 2004170003 A * | 6/2004 | | C03B 5/26 |
| KR | 100355552 B1 * | 1/2003 | | H01J 29/86 |
| WO | 9838136 A1 | 9/1998 | | |
| WO | WO-9838136 A1 * | 9/1998 | | C03B 5/167 |
| WO | WO-2018081772 A1 * | 5/2018 | | C03B 7/094 |

\* cited by examiner

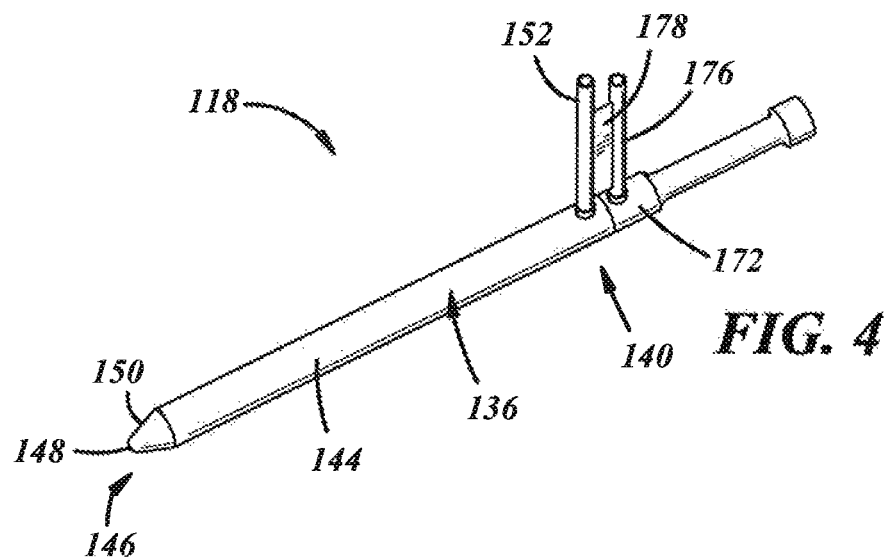
*FIG. 4*
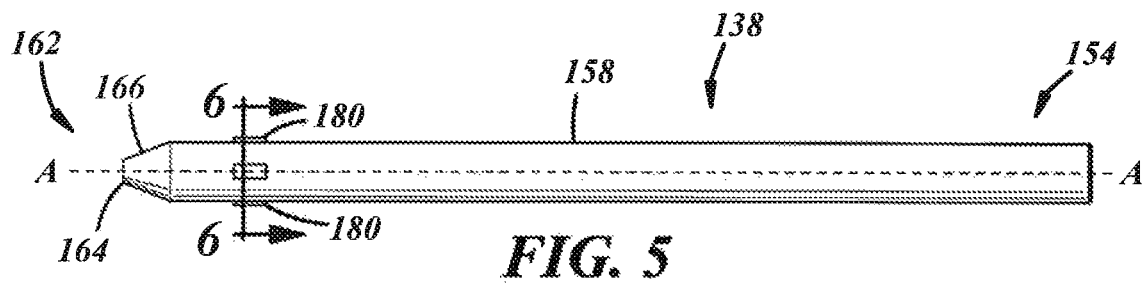
*FIG. 5*
*FIG. 6*
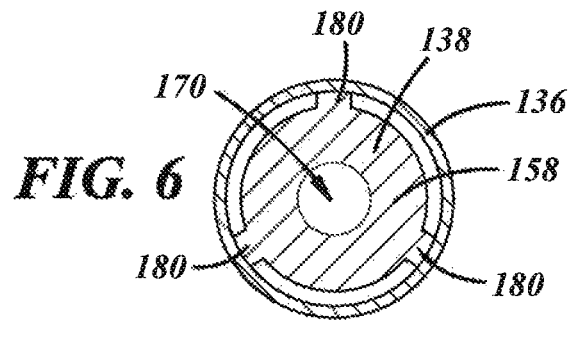
*FIG. 7*

FLUID-COOLED NEEDLE FOR MOLTEN MATERIAL FLOW CONTROL

TECHNICAL FIELD

This patent application discloses devices and methods for use in molten material manufacturing, and more particularly, devices for controlling molten material flow from a feeding spout.

BACKGROUND

Glass manufacturing often occurs at high temperatures, and molten glass can be corrosive, which requires equipment used in the glass manufacturing process to withstand harsh conditions. In particular, a furnace may use submerged combustion melting ("SCM"), which is a specific type of glass manufacturing, where an air-fuel or oxygen-fuel mixture can be injected directly into a pool of molten glass. As combustion gases forcefully bubble through the molten glass, they create a high-heat transfer rate and turbulent mixing of the molten glass until it achieves a uniform composition. The molten glass can then flow from the furnace to a stilling tank, which can include a feeding spout for feeding the molten glass to downstream molten glass refining and conditioning equipment. Also, or instead, a downstream molten glass forehearth may include a feeding spout for feeding molten glass to downstream forming equipment. In any case, the feeding spout typically includes a flow control needle and corresponding orifice to control an output flow of molten glass.

BRIEF SUMMARY OF THE DISCLOSURE

The present disclosure embodies a number of aspects that can be implemented separately from or in combination with each other.

A molten material flow control needle in accordance with one aspect of the disclosure includes a longitudinal axis; an outer conduit including an outer base end having an outlet, an outer body extending axially away from the outer base end, and an outer free end axially spaced apart from the outer base end; and an inner conduit including an inner base end having an inner conduit inlet, an inner body extending axially away from the inner base end and being radially spaced from the outer body of the outer conduit, an inner free end, and a central inlet passage extending between the inlet and the inner free end.

In accordance with another aspect of the disclosure, there is provided a molten material furnace system including a melter; and a stilling tank appended to the melter, the stilling tank including an outlet orifice having a longitudinal axis; and a molten material flow control mechanism configured to be axially positioned within at least a portion of the outlet orifice along the longitudinal axis.

In accordance with another aspect of the disclosure, there is provided a method for using a molten material flow control needle including the steps of flowing a heat exchange fluid through a molten material flow control needle; and axially adjusting the control needle to control molten material flow from a stilling tank of a melter.

BRIEF DESCRIPTION OF THE DRAWINGS

The disclosure, together with additional objects, features, advantages and aspects thereof, will be best understood from the following description, the appended claims and the accompanying drawings, in which:

FIG. 4 is an isometric view of the fluid-cooled molten material flow control needle shown in FIGS. 1 through 3, in accordance with an illustrative embodiment of the present disclosure;

FIG. 5 is a cross-sectional view of an inner conduit of the fluid-cooled molten material flow control needle shown in FIGS. 1 through 4, in accordance with an illustrative embodiment of the present disclosure;

FIG. 6 is a cross sectional view of the inner conduit shown along line 6-6 in FIG. 5, illustrated with a plurality of standoffs, in accordance with an illustrative aspect of the present disclosure; and FIG. 7 is a flow diagram showing various steps of an illustrative embodiment of a method for using the fluid-cooled molten material flow control needle as shown in FIGS. 1 through 4.

DETAILED DESCRIPTION

In accordance with at least one aspect of the disclosure, a fluid-cooled molten material flow control needle for a molten material furnace system and method for using the flow control needle is provided that uses a heat exchange fluid for preventing or reducing temperature gradients within the control needle, thereby minimizing damage to the flow control needle.

Harsh environments, including corrosiveness and high temperatures, within a melting furnace for glass manufacturing can lead to wear, cracking, erosion, and/or failure of furnace components. For example, temperatures in the melting furnace can often be between approximately 1300-1500 degrees Celsius (° C.) or higher. Additionally, the molten material, for example molten glass, can be generally corrosive to melting furnace components.

Melting furnaces may include a needle or plunger formed of refractory that can be used for controlling gob volume exiting the furnace. A needle or plunger formed of refractory requires frequent replacement to avoid fracturing of the refractory or other damage, often due to a temperature gradient from end to end of the needle or plunger caused by the molten material. A temperature gradient may be caused during a furnace shutdown when heat is reduced, or because of temperature differences between molten material, furnace components, and/or factory ambient temperatures. A refractory needle or plunger requires constant rotation during operation to even its temperature profile and reduce a chance of fracture and local erosion. Frequent replacement and constant rotation of the refractory needle or plunger can be inconvenient and costly.

Accordingly, a fluid-cooled molten material flow control needle, a molten material furnace system, and method are disclosed. The flow control needle can be fluid-cooled to reduce or prevent a thermal gradient and fracturing and damage. Additionally, the flow control needle may be formed of a metal and does not require constant rotation. The flow control needle can also be used to control flow rate of molten material from a furnace, which is not conventionally performed in the glass industry. Liquid cooling the flow control needle allows it to withstand being subject to molten material for long periods of time.

Figure 1:
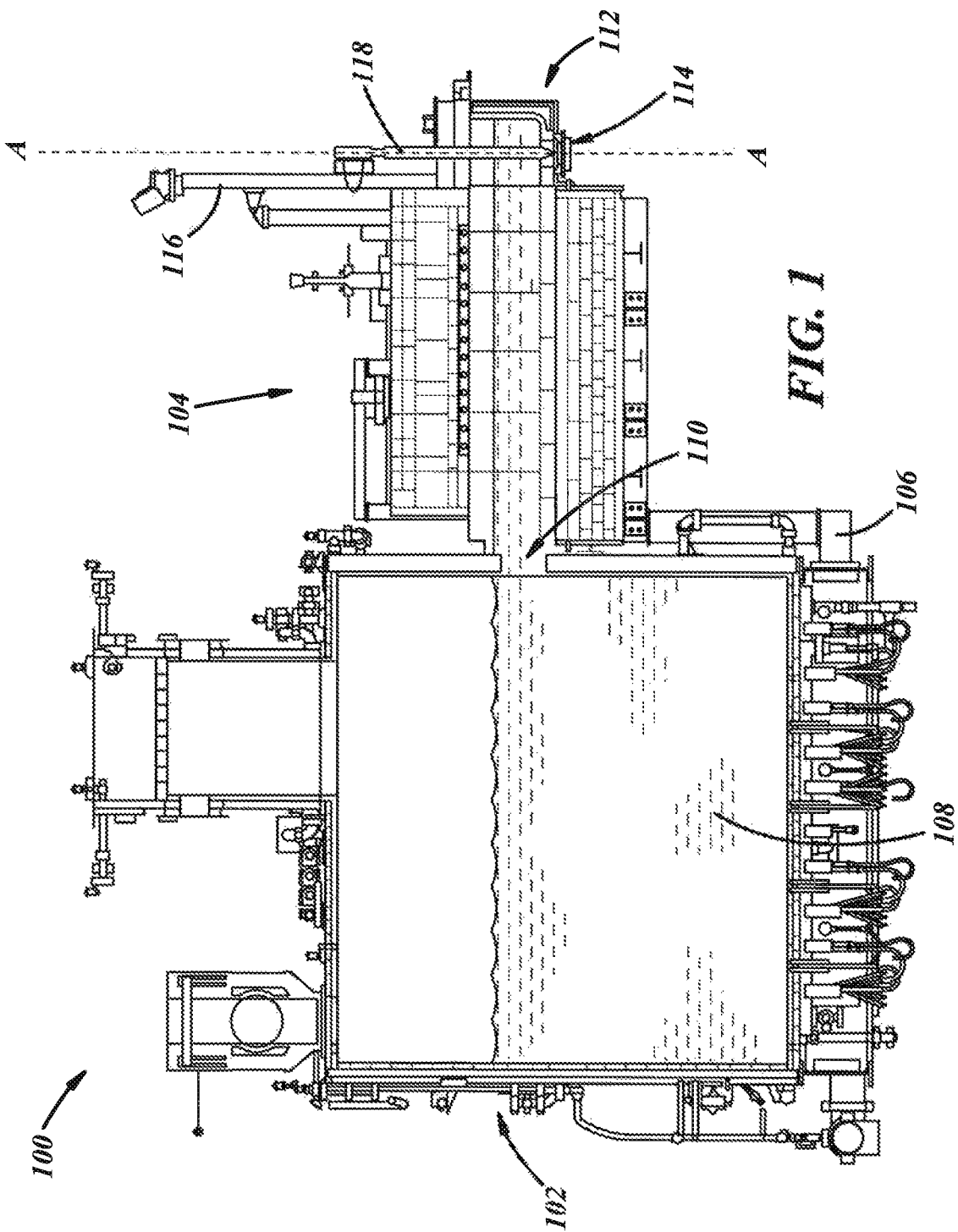
FIG. 1 is a cross-sectional view of a molten material furnace system including a feeding spout with a fluid-cooled molten material flow control needle, in accordance with an illustrative embodiment of the present disclosure.

Referring to FIG. 1, a molten material furnace system 100 can include a melter 102 and a stilling tank 104 appended to the melter 102. The melter 102 can provide a molten material to the stilling tank 104, which can in turn dispense the molten material to a downstream location (e.g., a forming mold). While glass may be generally used for examples herein, the molten material can also include other suitable materials, for example metal, waste products, or the like.

As shown in FIG. 1, the melter 102 can be configured for melting, containing, and/or refining the molten material. For example, the melter 102 may include a glass melter (e.g., a submerged combustion melter "SCM") or a furnace for melting metal, waste, or other suitable material for melting. In particular, a submerged combustion melter can inject an air-fuel or oxygen-fuel mixture directly into a pool of molten glass. As combustion gases forcefully bubble through the molten glass, they create a high-heat transfer rate and turbulent mixing of the molten glass until it achieves a uniform composition. A typical submerged combustion melter can have a floor and a vertical burner passage extending through the floor, and a burner positioned within the burner passage can be submerged in the molten glass. A batch charger can feed piles of glass batch onto an exposed surface of molten glass in the melter, and the piles can slowly drift away from the charger and submerge into the molten glass.

FIG. 1 depicts the stilling tank 104 appended and/or connected to the melter 102 with both the stilling tank 104 and the melter 102 mechanically attached and supported on a common frame 106 to rock and vibrate in unison in response to sloshing and a generally turbulent nature of the molten material (e.g., glass melt 108). The stilling tank 104 can receive the molten material discharged through a throat 110 from the melter 102, which may have a tendency to have a fluctuating flow rate, and can deliver the molten material at a controlled flow rate to the downstream component. In this way, the melter 102 and stilling tank 104 can be operated to produce molten glass or other molten material. The stilling tank 104 may additionally be operated to partially fine and/or reduce the foam content of the intermediate pool of molten glass or material that pools within the stilling tank 104 while also preventing heat loss from the molten material.

The stilling tank 104 depicted in FIG. 1 includes a feeding spout 112 appended to the stilling tank 104. The feeding spout 112 can include an outlet orifice 114 through which the molten material may be dispensed from the stilling tank 104. The outlet orifice 114 may include a heated orifice, for example, and may include a variety of sizes, shapes, and/or configurations. In an example, the outlet orifice 114 may include a circular and/or cylindrical opening configured to extrude molten glass.

As illustrated in FIG. 1, the stilling tank 104 may include a needle control assembly 116 coupled to the stilling tank 104 for adjusting and/or controlling a flow control needle 118. The needle control assembly 116 can be configured to position the flow control needle 118 relative to the outlet orifice 114 to control flow of the molten material through the outlet orifice 114. For example, the needle control assembly 116 can position the flow control needle 118 proximate the outlet orifice 114 to reduce flow of the molten material and can retract the flow control needle 118 from proximate the outlet orifice 114 to increase flow of the molten material. Also, in operation, a flow of heat exchange fluid through the needle is increased or decreased depending on an axial position of the needle. Additionally, although the subject matter disclosed herein is described with specific illustrative reference to an SCM system, those of ordinary skill in the art will recognize that the presently disclosed subject matter is also suitable for use with more conventional melting systems and may be used in conjunction with a forehearth feeding spout.

Figure 2:
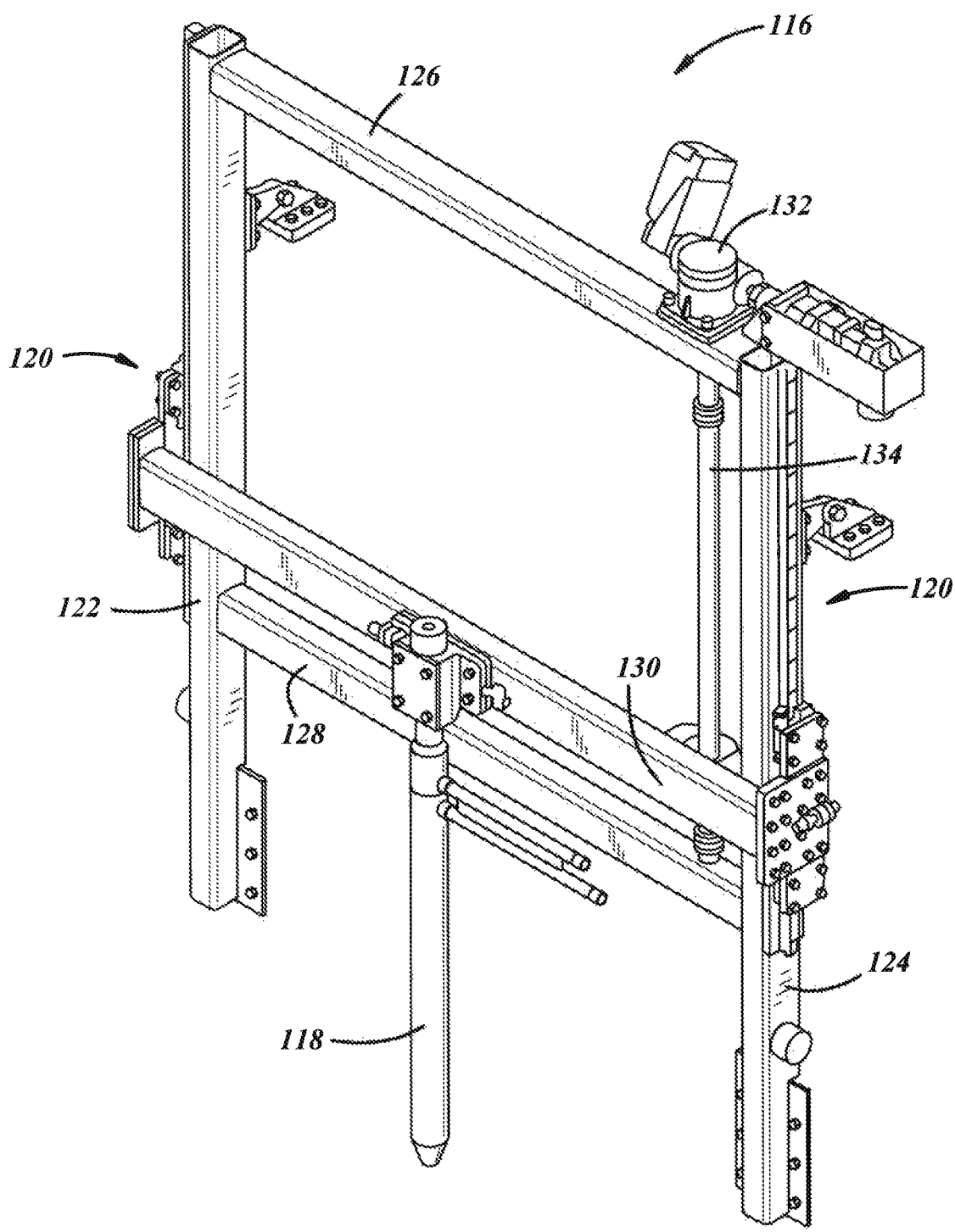
FIG. 2 is an isometric view of a needle control assembly of the molten material furnace system that adjusts position of the fluid-cooled molten material flow control needle shown in FIG. 1, in accordance with an illustrative embodiment of the present disclosure.

FIG. 2 further illustrates the needle control assembly 116 comprising a main frame 120, which further comprises a first rail guide 122 and a second rail guide 124 coupled together by a first cross bar 126 and a second cross bar 128. It will be appreciated that the main frame 120 may include additional rail guides and/or cross bars or rail guides and cross bars in different configurations. The first rail guide 122 and the second rail guide 124 can be couplable to and/or supported by the stilling tank 104.

Shown in FIG. 2, the needle control assembly 116 can also include a cross frame 130 coupled to and movable along the first rail guide 122 and the second rail guide 124. The cross frame 130 can be configured to carry and move the flow control needle 118 along a longitudinal axis A as the cross frame 130 moves along the first rail guide 122 and the second rail guide 124. In some instances, the needle control assembly 116 may be configured to carry and move the flow control needle 118 in a direction other than along longitudinal axis A (e.g., perpendicular to longitudinal axis A).

The needle control assembly 116 is shown in FIG. 2 including a servo motor 132 coupled to the first cross bar 126 and a shaft 134 coupled to the servo motor 132 and the cross frame 130. The shaft 134 may be configured to move the cross frame 130 relative to the first cross bar 126. One example of the shaft 134 can include a screw drive, for example. The servo motor 132 can rotate the shaft 134, which can be configured to move the cross frame 130 up and/or down and, in turn, axially move the flow control needle 118 along longitudinal axis A. It will be appreciated that the needle control assembly 116 can include other suitable devices for moving the cross frame 130 and flow control needle 118, for example a hydraulic and/or pneumatic actuator coupled to the shaft 134 and/or the first cross bar 126. Those of ordinary skill in the art will recognize that the cross frame 130 may be guided along the rail guides 122, 124 via bearing assemblies, pillow blocks, guide rods, and/or any other suitable guide devices. In any case, the needle control assembly 116 can be easily removed and replaced from the stilling tank for maintenance and/or relocation of the equipment.

Figure 3:
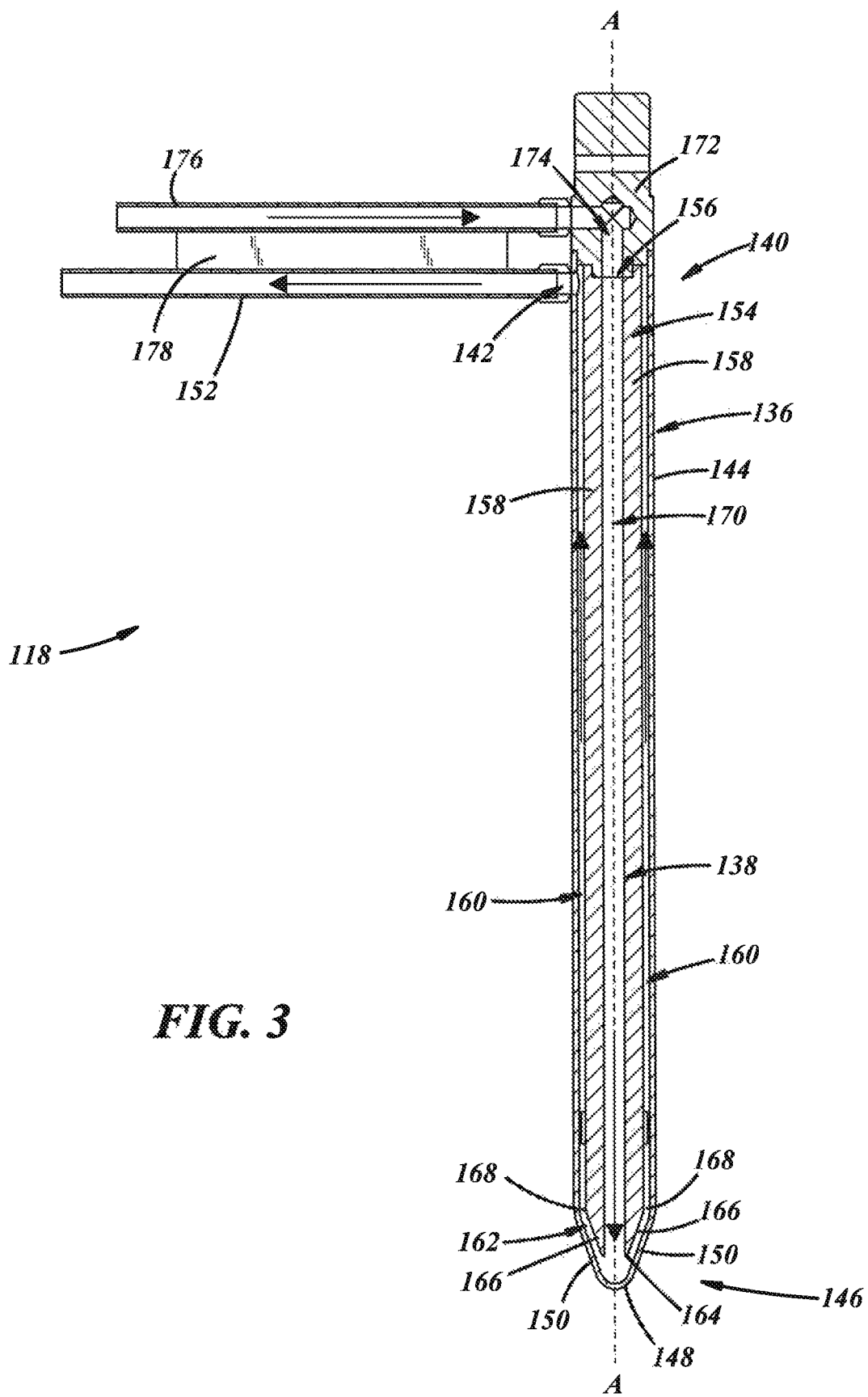
FIG. 3 is a cross-sectional view of the fluid-cooled molten material flow control needle in the molten material furnace system shown in FIG. 1, and controllable by the needle control assembly shown in FIG. 2, in accordance with an illustrative embodiment of the present disclosure.

FIG. 3 illustrates an embodiment of the molten material flow control needle 118. In this embodiment, the flow control needle 118 can include an outer conduit 136 and an inner conduit 138. A heat exchange fluid can flow between the outer conduit 136 and the inner conduit 138 for cooling the flow control needle 118 and preventing/reducing a thermal gradient throughout the flow control needle 118. The heat exchange fluid can include suitable fluids for carrying heat from the flow control needle 118, for example water, a coolant or high-boiling point fluid, a glycol family liquid, an aqueous glycol liquid, or any other fluid suitable for use in cooling a molten glass flow control needle.

As shown in FIG. 3, the outer conduit 136 can include an outer base end 140 having a conduit outlet 142 and an outer body 144 that extends axially away from the outer base end 140. The outer conduit 136 and the outer body 144 can be of any shape suitable to interface with the shape of the corresponding outlet orifice and, as such, may take on a number of shapes and dimensions, cylindrical, or otherwise. Additionally, the outer conduit 136 can include an outer free end 146 axially spaced apart from the outer base end 140, where the outer free end 146 may terminate in the form of a rounded apex 148 and a conical wall 150 extending between the rounded apex 148 and the outer body 144. In an embodiment, the outer body 144 may be tapered, for example the outer base end 140 may have a larger diameter than the outer free end 146. In other embodiments, the outer free end 146 may take on other shapes and configurations, for example a sphere and/or a ball end. Different shapes and/or configurations may serve to control flow of molten material from the stilling tank 104. For example, the outer free end 146 may include a substantially spherical rounded apex 148. In another example, the conical wall 150 can be only slightly tapered at a small angle from the longitudinal axis A (e.g., 10°) resulting in a sharply pointed free end 146, which would require more stroke length of the flow control needle 118 and allow for more precise flow control. In yet another example, the conical wall 150 can be greatly tapered at a larger angle from the longitudinal axis A (e.g., 45°) resulting in a less pointed free end 146, which would allow less precise flow control but require a shorter stroke length of the flow control needle 118. The outer free end 146 may also be configured to match a profile of the outlet orifice 114. The outer conduit 136 can serve as the outer portion of the flow control needle 118 and can be configured to contact the molten material in the stilling tank 104. Heat exchange fluid can flow from the flow control needle 118, which can extend through the outer body 144, and through a needle outlet 152 coupled to the conduit outlet 142. The outer conduit 136 may comprise a material resistant to thermal stress and corrosion by the molten material, for example a metal (e.g., stainless steel or the like).

In the embodiment in FIG. 3, the flow control needle 118 includes an inner conduit 138. The inner conduit 138 can comprise an inner base end 154 having an inner conduit inlet 156 and an inner body 158 that extends axially away from the inner base end 154. The inner body 158 can be radially spaced inward from the outer body 144 of the outer conduit 136, for example by having a semi-open profile on the inner terminus and/or apex 164 and/or by having a semi-open profile on the outer terminus and/or rounded apex 148, by using space-out dowels on the inner terminus and/or apex 164, and/or by using precision machining and measurement to ensure correct spacing. An outer passage 160 for carrying the heat exchange fluid can be defined by the outer body 144 and the inner body 158. The inner conduit 138 additionally can include an inner free end 162 having an inner terminus or apex 164 inwardly spaced from the rounded apex 148 of the outer free end 146 of the outer conduit 136 and can include a conical outer surface 166 extending between the inner apex 164 and an outer surface 168 of the inner body 158. In other embodiments, the inner free end 162 may take on other shapes and configurations. A central inlet passage 170 can extend between the inner conduit inlet 156 and the inner apex 164, through which the heat exchange fluid can enter the flow control needle 118. In an example, a ratio of cross-sectional area of the outer passage 160 to a cross-sectional area of the central inlet passage 170 may be from about 1:1 to about 4:1, including all ranges, subranges, end points, and values therein. The ratio can be configured so that flow velocity of the heat exchange fluid is lower in the outer passage 160 than in the central inlet passage 170 to absorb more heat from the outer conduit 136. The inner conduit 138 may comprise a material resistant to thermal stress and corrosion by the molten material, for example, a metal (e.g., stainless steel or the like). A wall thickness of the inner conduit is over twice as thick as a wall thickness of the outer conduit.

In some instances, and as shown in FIG. 3, the flow control needle 118 may include an end cap fitting 172. The end cap fitting 172 can be coupled to the outer base end 140 and the inner base end 154 and can have a central fluid passage 174, which can be in fluid communication with the central inlet passage 170 of the inner conduit 138. Additionally, the end cap fitting 172 can include a needle inlet 176 in fluid communication with the central fluid passage 174. Heat exchange fluid can flow through the needle inlet 176 into the central fluid passage 174 and the central inlet passage 170. The end cap fitting 172 and/or the needle inlet 176 can comprise a material that is resistant to thermal stress and corrosion, for example a metal (e.g., stainless steel and the like). In some instances, the end cap fitting 172 may be integrally formed with the outer base end 140, the inner base end 154, the needle inlet 176, and/or the needle outlet 152. Additionally, a support 178, for example, a metal plate, may be coupled to the needle inlet 176 and the needle outlet 152.

FIG. 4 shows an isometric view of the flow control needle 118 comprising the outer conduit 136 including the outer body 144, the outer free end 146 with the rounded apex 148 and the conical wall 150, and the end cap fitting 172 coupled to the outer base end 140. FIG. 4 also shows an arrangement of the needle outlet 152, the needle inlet 176, and the support 178 coupling the needle inlet 176 and the needle outlet 152.

In some instances, and as shown in FIGS. 3 and 5, the flow control needle 118 can include at least one standoff 180. The at least one standoff 180 can be disposed and circumferentially spaced on an outside surface of the inner body 158, and, in some instances, may be integrally formed with the inner body 158. The inner conduit 138 can be configured to be disposed within the outer conduit 136, and the at least one standoff 180 can be disposed at a location distal to the inner base end 154 and proximate the inner free end 162 to space the inner conduit 138 from the outer conduit 136 and provide a concentrically axially-extending outer passage 160 between the outer conduit 136 and the inner conduit 138 through which the heat exchange fluid can flow. Heat exchange fluid flowing within the outer passage 160 can flow concurrent to the heat exchange fluid flowing within the central inlet passage 170.

FIG. 6 illustrates a cross sectional view along line 6-6 shown in FIG. 5. As shown in FIG. 6, three standoffs 180 can be disposed on the outer surface 168 of the inner body 158 of the inner conduit 138, and the central inlet passage 170 can be disposed within the inner body 158. The three standoffs 180 can function to provide suitable spacing for heat exchange fluid flow between the inner conduit 138 and the outer conduit 136. It will be appreciated that more or less than three standoffs 180 may be disposed on the inner body 158.

FIG. 7 illustrates an example of a method 200 for using the molten material flow control needle 118. For purposes of illustration and clarity, method 200 will be described in the context of the molten material furnace system 100 described above and generally illustrated in FIGS. 1 through 6. It will be appreciated, however, that the application of the present methodology is not meant to be limited solely to such an arrangement, but rather method 200 may find application with any number of arrangements.

Method 200 includes a step 202 of flowing heat exchange fluid through the molten material flow control needle 118. In operation, the heat exchange fluid, for example, water, can flow into the molten material flow control needle 118 through the needle inlet 176, the central fluid passage 174, and into the central inlet passage 170 to the outer free end 146. The heat exchange fluid can continue to flow from the outer free end 146 through the inner apex 164 into the outer passage 160 between the inner body 158 and the outer body 144. The heat exchange fluid in the outer passage 160 can flow concurrent to the flow in the central inlet passage 170 and can absorb heat from the molten material through the outer body 144. By absorbing the heat, the flowing heat exchange fluid can minimize thermal gradients and prevent thermal damage to the flow control needle 118. The heat exchange fluid in the outer passage 160 can then flow through the conduit outlet 142, into the needle outlet 152, and out of the flow control needle 118. The heat exchange fluid can be pumped using a fluid pump (not shown) coupled to the flow control needle 118.

Method 200 includes a step 204 of axially adjusting the flow control needle 118 to control molten material flow from the stilling tank 104. The flow control needle 118 can be axially adjusted along longitudinal axis A toward and/or away from the outlet orifice 114 using the needle control assembly 116. For example, when a reduced molten material flow is desired, the needle control assembly 116 can move the flow control needle 118 toward and proximate to the outlet orifice 114 and function as at least a partial flow obstruction. Proximity of the flow control needle 118 with respect to the outlet orifice 114 functioning as a partial obstruction reduces flow area through the outlet orifice 114, thereby also reducing molten material flow. When an increased molten material flow is desired, the needle control assembly 116 can move the flow control needle 118 away from the outlet orifice 114, reduce obstruction by the flow control needle 118, and increase the flow area through the outlet orifice 114, thereby increasing molten material flow. Additionally, the flow control needle 118 does not need to be constantly rotated like traditional needles or plungers.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The drawings are not necessarily shown to scale. The disclosure is intended to embrace all such modifications and variations as fall within the spirit and broad scope of the appended claims.

The invention claimed is:

1. A molten material flow control needle, comprising:
    a longitudinal axis;
    an outer conduit including
        an outer base end having an outlet,
        an outer body extending axially away from the outer base end, and
        an outer free end axially spaced apart from the outer base end;
    an inner conduit and including
        an inner base end having an inner conduit inlet,
        an inner body extending axially away from the inner base end and being radially spaced from the outer body of the outer conduit and having an inner body wall thickness greater than an outer body wall thickness of the outer conduit,
        an inner free end, and
        a central inlet passage extending between the inlet and the inner free end;
    an outer passage between the inner and outer bodies of the inner and outer conduits and concentric with the central inlet passage; and
    an end cap fitting coupled to the base ends of the inner and outer conduits and having a central fluid passage directly in fluid communication with the central inlet passage of the inner conduit and having a needle inlet.

2. The molten material flow control needle of claim 1, wherein the control needle comprises metal including stainless steel.

3. The molten material flow control needle of claim 1, wherein the outer free end includes a rounded apex and a conical wall extending between the rounded apex and the outer body.

4. The molten material flow control needle of claim 1, wherein the inner free end includes an inner apex axially spaced from a rounded apex of the outer free end, and a conical outer surface extending between the inner apex and an outer surface of the inner body.

5. The molten material flow control needle of claim 1, wherein the inner body wall thickness of the inner conduit is over twice as thick as the outer body wall thickness of the outer conduit.

6. The molten material flow control needle of claim 1, wherein the inner free end of the inner conduit extends into the outer free end of the outer conduit.

7. A molten material flow control needle, comprising:
    a longitudinal axis;
    an outer conduit including
        an outer base end having an outlet or inlet,
        an outer body extending axially away from the outer base end and having an outer body wall thickness, and
        an outer free end axially spaced apart from the outer base end; and
    an inner conduit including
        an inner base end having an inner conduit inlet or outlet,
        an inner body extending axially away from the inner base end and being radially spaced from the outer body of the outer conduit and having an inner body wall thickness greater than an outer body wall thickness of the outer conduit,
        an inner free end, and
        a central inlet passage extending between the inlet and the inner free end.

8. The molten material flow control needle of claim 7, wherein the inner body wall thickness is over twice as thick as the outer body wall thickness.

9. The molten material flow control needle of claim 7, wherein the inner body includes a plurality of standoffs circumferentially spaced around an outside surface of the inner body.

10. The molten material flow control needle of claim 7, wherein the outer free end of the outer conduit is a tapered outer free end and the inner free end of the inner conduit extends into the tapered outer free end.

11. The molten material flow control needle of claim 7, wherein the outer free end includes a rounded apex and a conical wall extending between the rounded apex and the outer body, and the inner free end includes a conical outer surface and an inner apex inwardly spaced from the rounded apex of the outer free end.

12. A molten material flow control needle, comprising:
a longitudinal axis;
an outer conduit including
an outer base end having an outlet,
an outer body extending axially away from the outer base end, and
a tapered outer free end extending away from the outer body; and
an inner conduit including
an inner base end having an inner conduit inlet,
an inner body extending axially away from the inner base end and being radially spaced from the outer body of the outer conduit,
an inner free end extending into the tapered outer free end of the outer conduit, and
a central inlet passage extending between the inlet and the inner free end, wherein the inner body has an inner body wall thickness greater than an outer body wall thickness of the outer conduit.

13. The molten material flow control needle of claim 12, wherein the inner body wall thickness is over twice as thick as the outer body wall thickness.

14. A molten material flow control needle, comprising:
a longitudinal axis;
an outer conduit including
an outer base end having an outlet,
an outer body extending axially away from the outer base end, and
an outer free end axially spaced apart from the outer base end;
an inner conduit and including
an inner base end having an inner conduit inlet,
an inner body extending axially away from the inner base end and being radially spaced from the outer body of the outer conduit,
an inner free end, and
a central inlet passage extending between the inlet and the inner free end;
an outer passage between the inner and outer bodies of the inner and outer conduits and concentric with the central inlet passage; and
an end cap fitting coupled to the base ends of the inner and outer conduits and having a central fluid passage directly in fluid communication with the central inlet passage of the inner conduit and having a needle inlet, wherein the inner conduit includes a plurality of circumferentially spaced standoffs at a location distal to the inner base end and at a location proximate to the inner free end.

15. A molten material flow control needle, comprising:
a longitudinal axis;
an outer conduit including
an outer base end having an outlet,
an outer body extending axially away from the outer base end, and
a tapered outer free end extending away from the outer body; and
an inner conduit including
an inner base end having an inner conduit inlet,
an inner body extending axially away from the inner base end and being radially spaced from the outer body of the outer conduit,
an inner free end extending into the tapered outer free end of the outer conduit, and
a central inlet passage extending between the inlet and the inner free end; and
wherein the inner conduit includes a plurality of circumferentially spaced standoffs at a location distal to the inner base end and at a location proximate to the inner free end.

16. The molten material flow control needle of claim 15, wherein the inner free end is a tapered inner free end.

17. The molten material flow control needle of claim 15, wherein the tapered outer free end includes a rounded apex and a conical wall extending between the rounded apex and the outer body, and the inner free end includes a conical outer surface and an inner apex inwardly spaced from the rounded apex of the outer free end.

18. An apparatus, comprising:
a feeding spout having an outlet orifice; and
a molten material flow control needle, including
a longitudinal axis;
an outer conduit including
an outer base end having an outlet,
an outer body extending axially away from the outer base end, and
an outer free end axially spaced apart from the outer base end;
an inner conduit and including
an inner base end having an inner conduit inlet,
an inner body extending axially away from the inner base end and being radially spaced from the outer body of the outer conduit,
an inner free end, and
a central inlet passage extending between the inlet and the inner free end;
an outer passage between the inner and outer bodies of the inner and outer conduits and concentric with the central inlet passage;
an end cap fitting coupled to the base ends of the inner and outer conduits and having a central fluid passage directly in fluid communication with the central inlet passage of the inner conduit and having a needle inlet, wherein the inner conduit includes a plurality of circumferentially spaced standoffs at a location distal to the inner base end and at a location proximate to the inner free end, wherein the control needle is configured to control a flow of molten material from the outlet orifice based on position of the control needle within the outlet orifice.

19. The apparatus of claim 18, wherein the molten material is glass.

20. The apparatus of claim 18, wherein, in operation, a flow of heat exchange fluid through the control needle is increased or decreased depending on an axial position of the needle to the outlet orifice of the feeding spout.

21. The apparatus of claim 20, wherein the heat exchange fluid is water.

* * * * *